US012453666B1

(12) United States Patent
Cazares

(10) Patent No.: US 12,453,666 B1
(45) Date of Patent: Oct. 28, 2025

(54) BEDFRAME LIFTING DEVICE

(71) Applicant: Luis Cazares, Ciceero, IL (US)

(72) Inventor: Luis Cazares, Ciceero, IL (US)

( * ) Notice: Subject to any disclaimer, the term of this patent is extended or adjusted under 35 U.S.C. 154(b) by 61 days.

(21) Appl. No.: 18/649,470

(22) Filed: Apr. 29, 2024

(51) Int. Cl.
*A61G 7/012* (2006.01)
*A47C 19/04* (2006.01)
*A61G 7/018* (2006.01)

(52) U.S. Cl.
CPC ............ *A61G 7/012* (2013.01); *A47C 19/045* (2013.01); *A61G 7/018* (2013.01)

(58) Field of Classification Search
CPC ........ A61G 7/012; A47C 19/045; A47C 17/84
USPC .................................................................. 5/11
See application file for complete search history.

(56) References Cited

U.S. PATENT DOCUMENTS 6,516,478 B2 2/2003 Cook
6,678,907 B1 * 1/2004 Voelker ................ A61G 7/0528 5/11
6,983,495 B2 1/2006 Snyder
D599,144 S 9/2009 Zerhusen
7,941,881 B2 5/2011 Hayes
10,786,086 B2 9/2020 Feldotto
11,786,042 B2 10/2023 Goldsmith
2007/0180620 A1 8/2007 Bellingroth
2007/0226901 A1 * 10/2007 Pervorse .................. B60P 1/02 5/118

FOREIGN PATENT DOCUMENTS

FR 2584283 A1 * 1/1987 ............. A47C 17/84
WO WO2016146406 9/2016

* cited by examiner

*Primary Examiner* — Eric J Kurilla

(57) ABSTRACT

A bedframe lifting device for enabling a physically disabled user to transfer from a wheelchair to a bed includes a bedframe and a lifting unit which is movably attached to the bedframe having the lifting unit resting upon a support surface. The lifting unit urges the bedframe downwardly toward the support surface to enable a user who employs a wheelchair to transfer from the wheelchair to a mattress that is positioned on the bedframe. The lifting unit urges the bedframe upwardly from the support surface to facilitate the user to sleep at a preferred height on the mattress. A communication unit is integrated into the lifting unit and the communication unit is in remote communication with a personal electronic to facilitate the user to remotely lift or lower the bedframe.

8 Claims, 7 Drawing Sheets

BEDFRAME LIFTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lifting devices and more particularly pertains to a new lifting device for enabling a physically disabled user to transfer from a wheelchair to a bed. The device includes a bedframe and a lifting unit that is integrated into the bedframe which can either lift the bedframe or lower the bedframe on a support surface.

(2) Description of Related Art Including Information Disclosed Under 37 CFR 1.97 and 1.98

The prior art relates to lifting devices including a variety of bed lifting devices that each includes a bedframe and a lifting unit integrated into the bedframe for lifting or lowering the bedframe. In some instances the lifting unit comprises a scissor lift and in other cases the lifting unit comprises a worm gear driven by an electric motor. In no instance does the prior art disclose a bed lifting device that includes a bedframe and a lifting unit integrated into the bedframe for lifting or lowering the bedframe and a communication unit integrated into the lifting unit which is in remote communication with a personal electronic device for remotely controlling the lifting unit.

BRIEF SUMMARY OF THE INVENTION

An embodiment of the disclosure meets the needs presented above by generally comprising a bedframe and a lifting unit which is movably attached to the bedframe having the lifting unit resting upon a support surface. The lifting unit urges the bedframe downwardly toward the support surface to enable a user who employs a wheelchair to transfer from the wheelchair to a mattress that is positioned on the bedframe. The lifting unit urges the bedframe upwardly from the support surface to facilitate the user to sleep at a preferred height on the mattress. A communication unit is integrated into the lifting unit and the communication unit is in remote communication with a personal electronic device to facilitate the user to remotely lift or lower the bedframe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
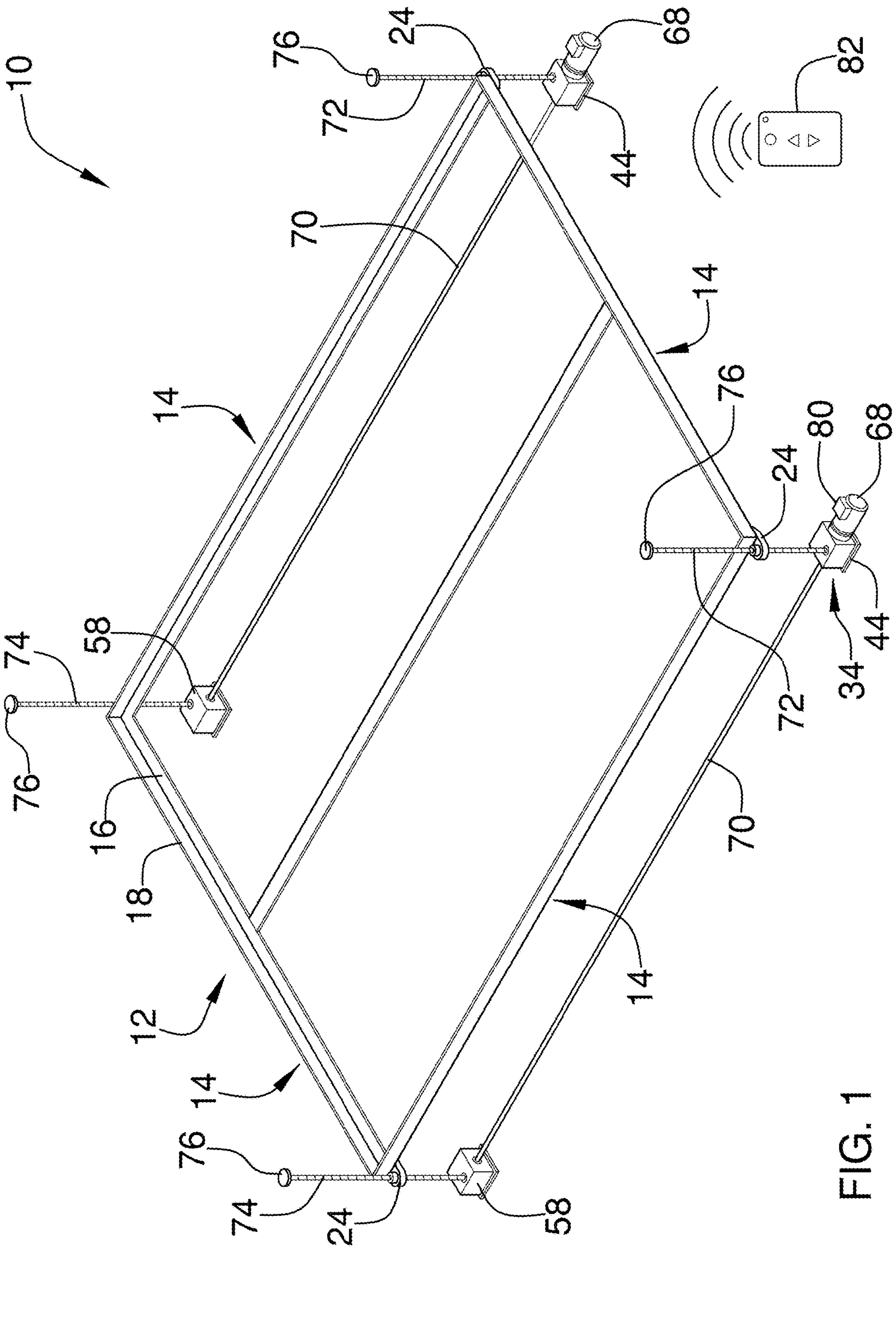
FIG. 1 is a top perspective view of a bedframe lifting device according to an embodiment of the disclosure.
Figure 2:
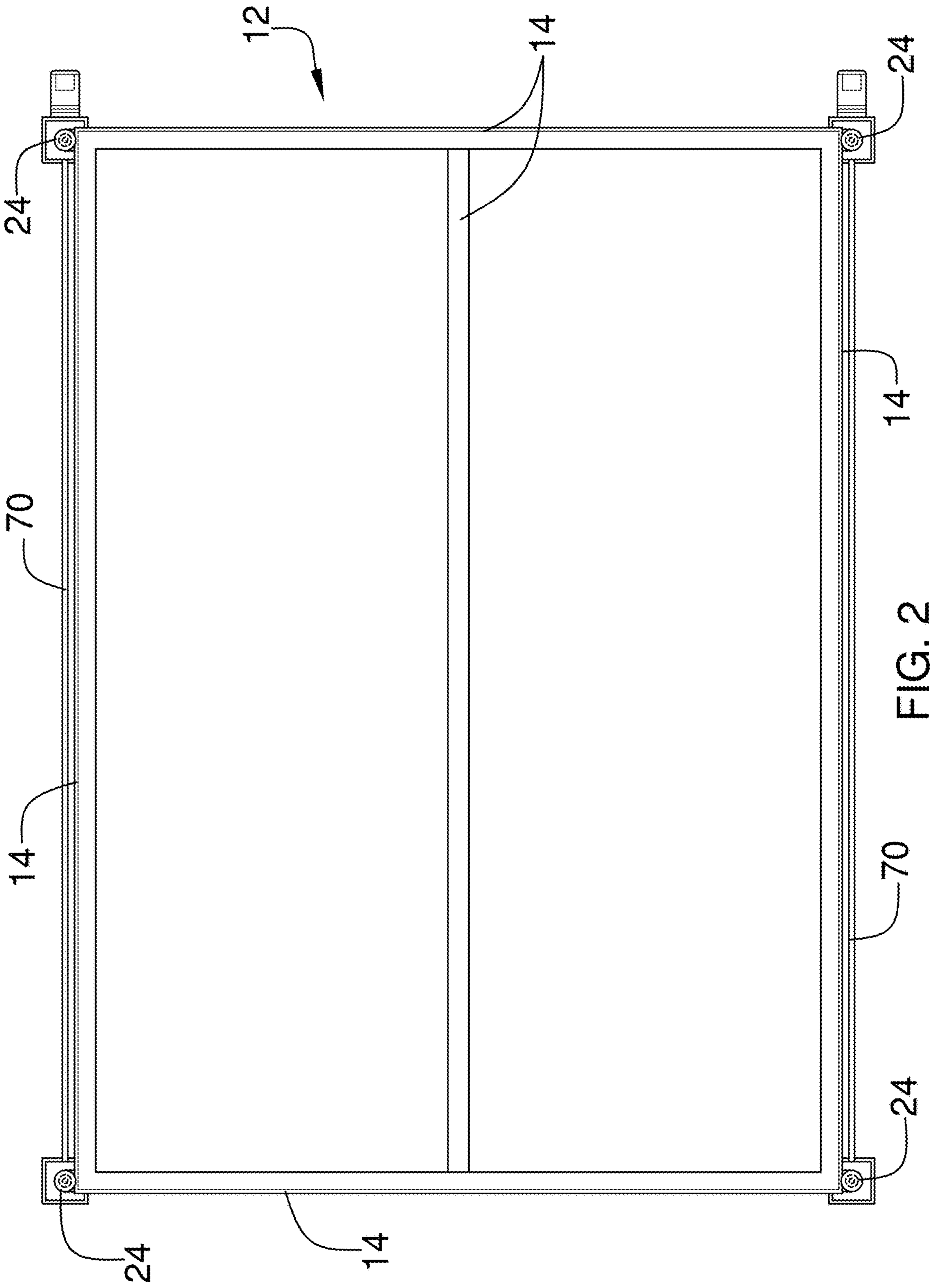
FIG. 2 is a top view of an embodiment of the disclosure.
Figure 3:
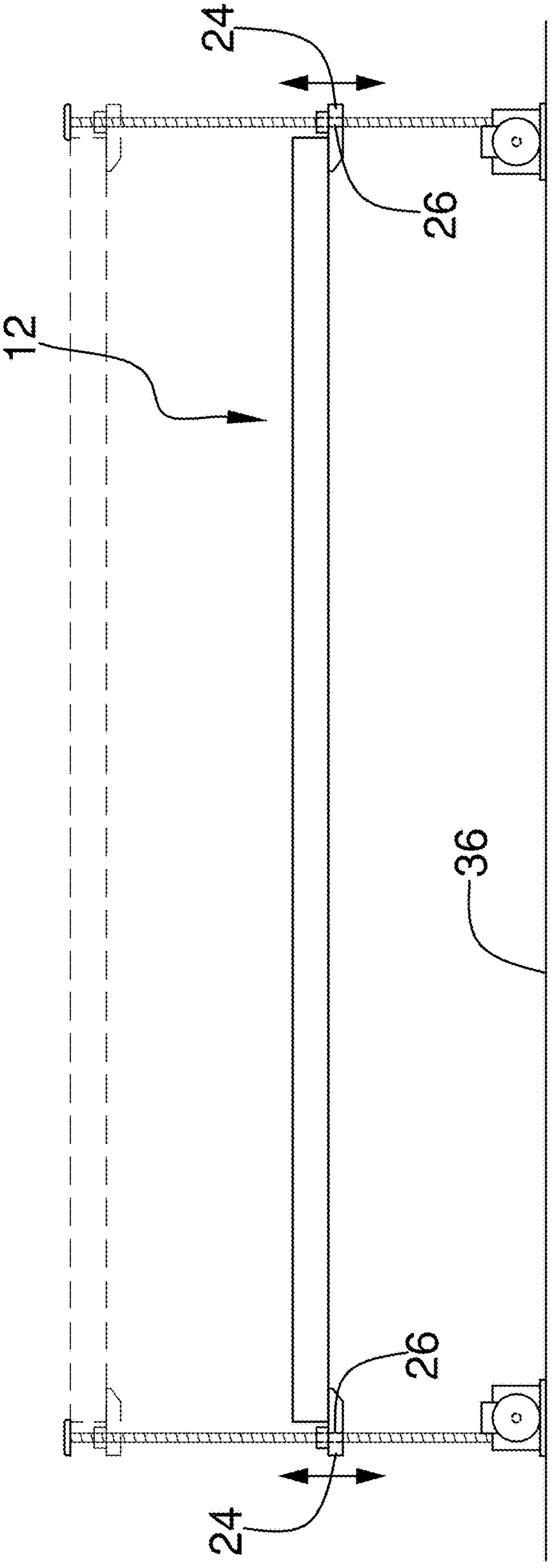
FIG. 3 is a front view of an embodiment of the disclosure.
Figure 4:
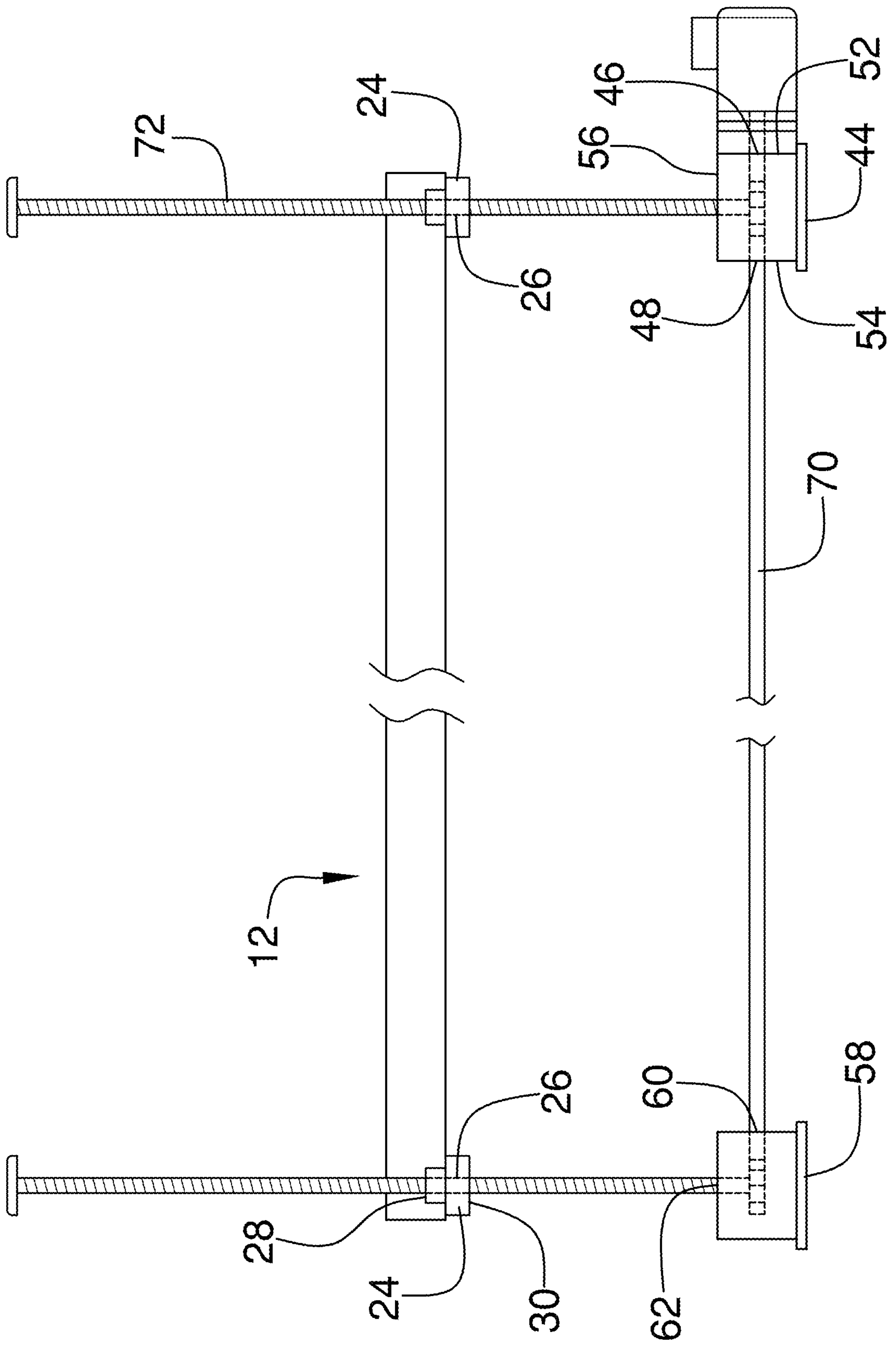
FIG. 4 is a left side view of an embodiment of the disclosure.
Figure 5:
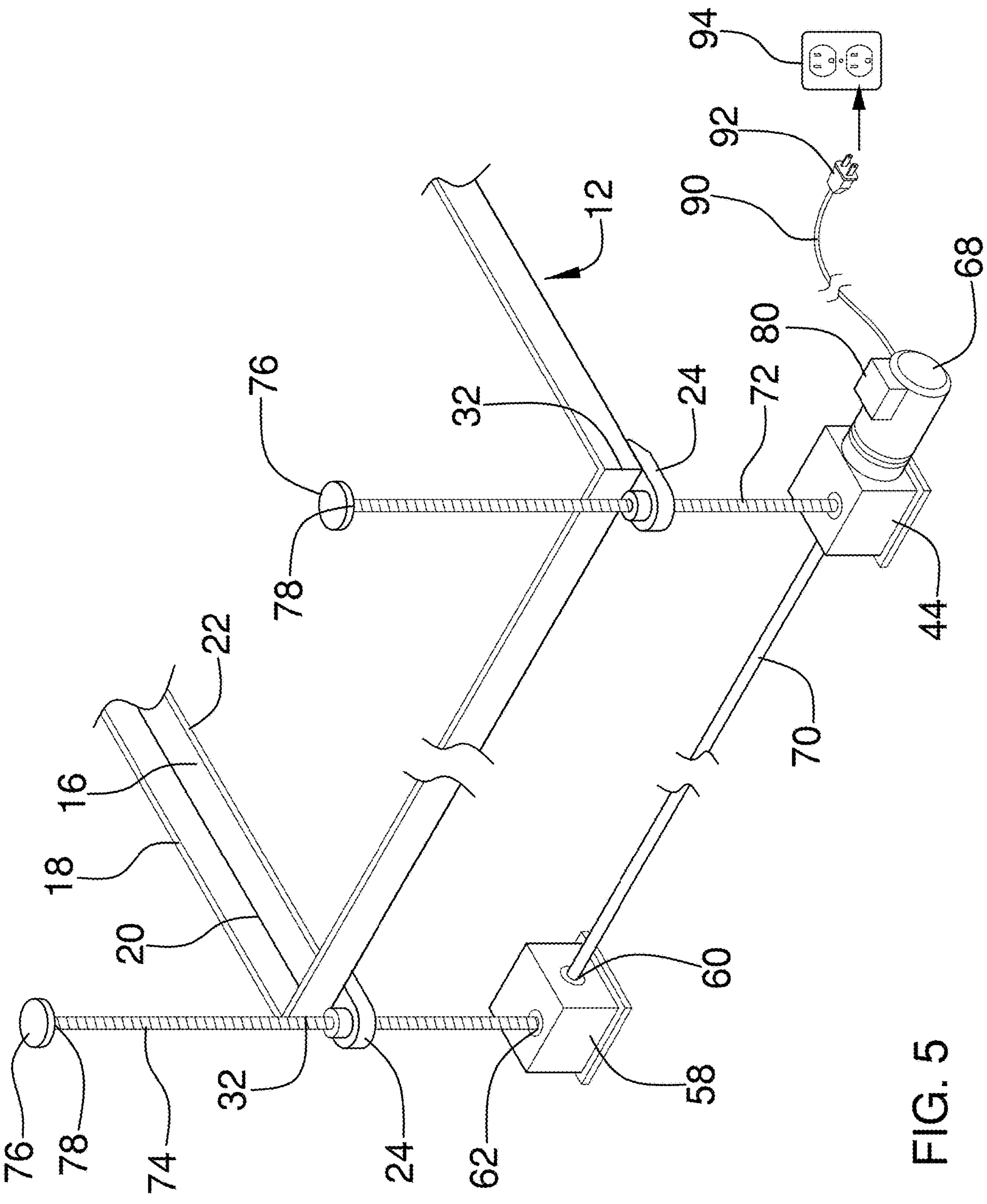
FIG. 5 is a front perspective view of an embodiment of the disclosure.
Figure 6:
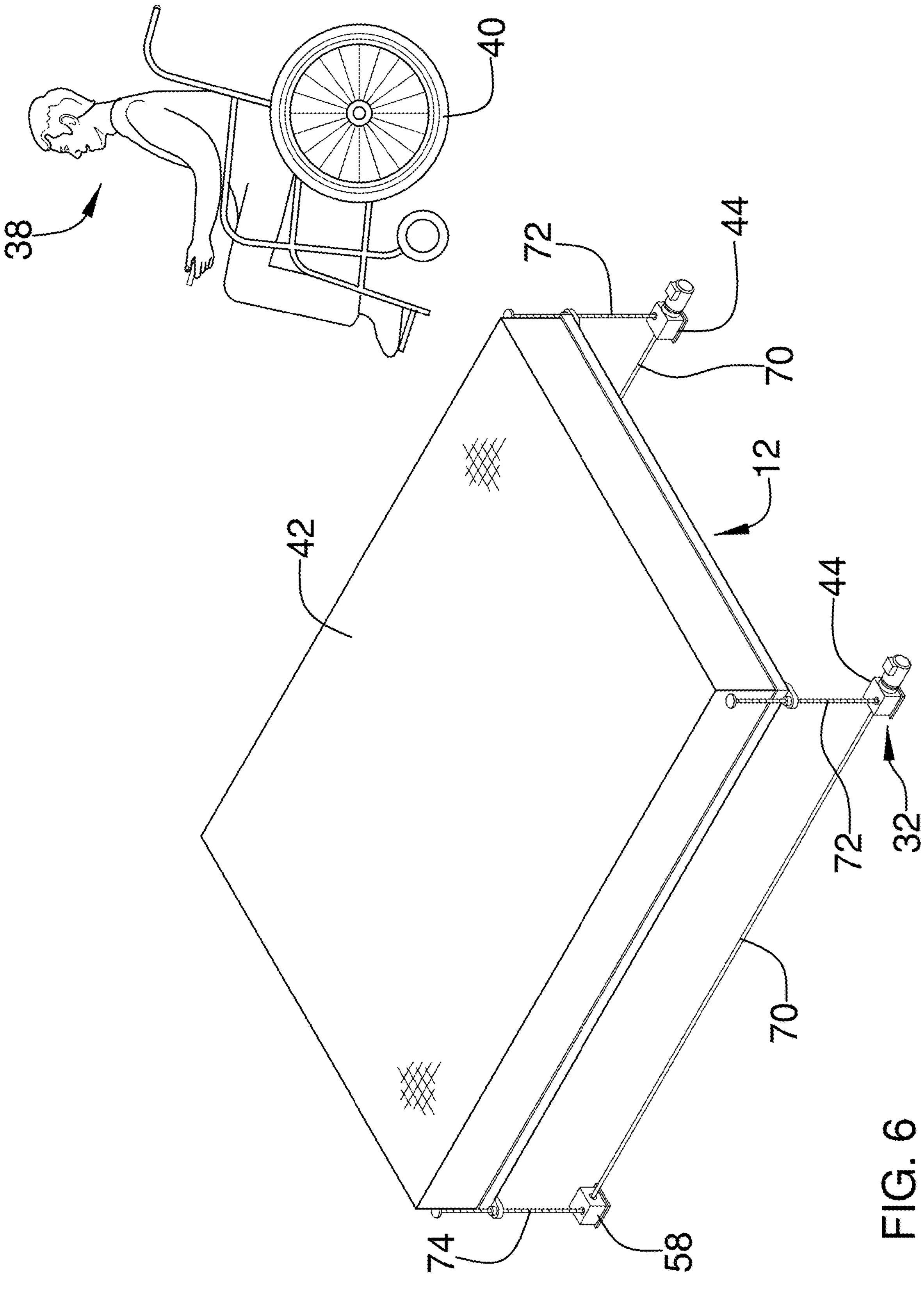
FIG. 6 is a perspective in-use view of an embodiment of the disclosure.
Figure 7:
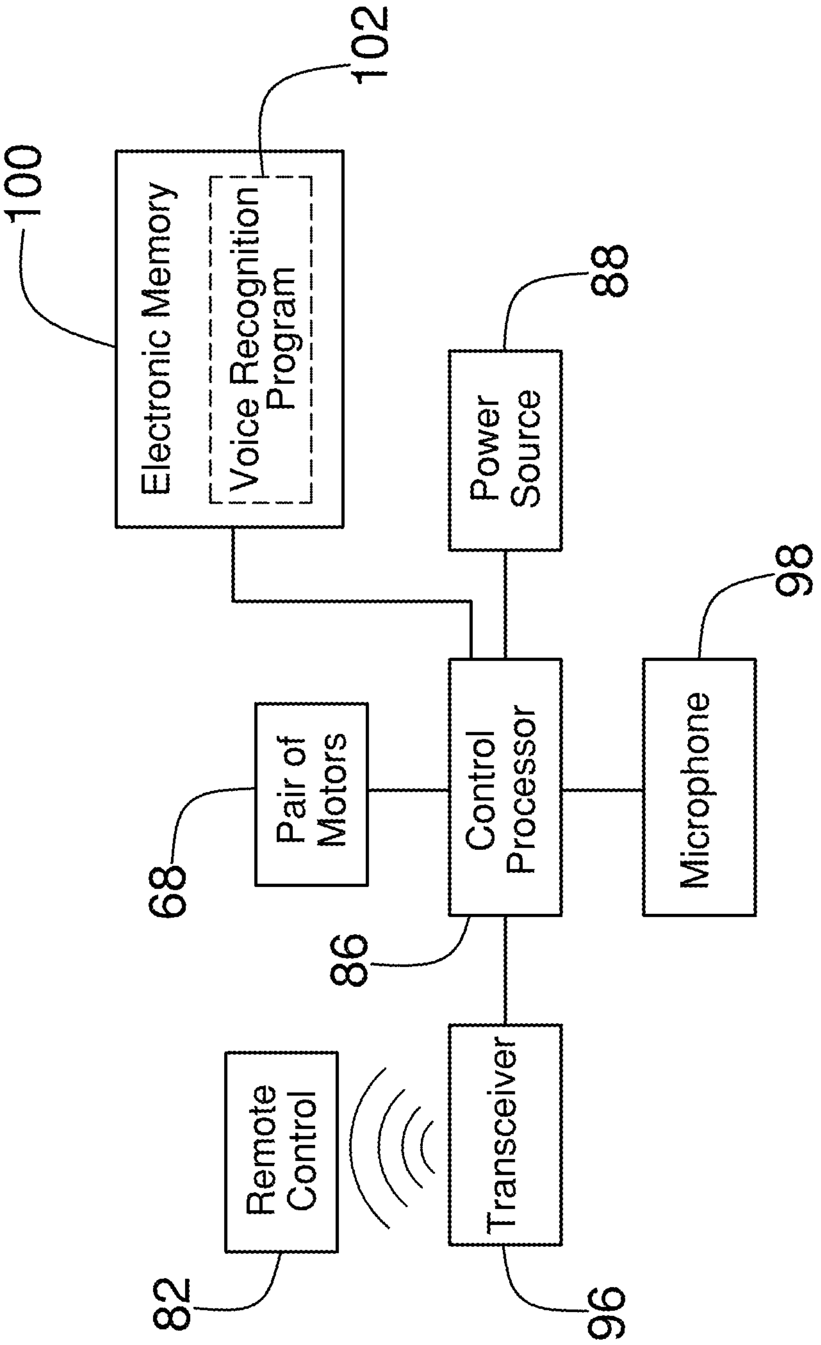
FIG. 7 is a schematic view of an embodiment of the disclosure.

With reference now to the drawings, and in particular to FIGS. 1 through 7 thereof, a new lifting device embodying the principles and concepts of an embodiment of the disclosure and generally designated by the reference numeral 10 will be described.

As best illustrated in FIGS. 1 through 7, the bedframe lifting device 10 generally comprises a bedframe 12 that has a plurality of intersecting members 14 which is perpendicularly oriented with each other such that the bedframe 12 has a rectangular shape. Each of the plurality of intersecting members 14 has a lower panel 16 which is perpendicular to an upper panel 18. Furthermore, the lower panel 16 of each of the plurality of intersecting members 14 lies on a horizontal plane and the upper panel 18 of each of the plurality of intersecting members 14 lies on a vertical plane. The upper panel 18 of each of the plurality of intersecting members 14 is aligned with an outwardly facing edge 20 of the lower panel 16 of a respective intersecting member 14. Additionally, an inwardly facing edge 22 of each of the plurality of intersecting members 14 is directed toward an opposing one of the plurality of intersecting members 14. The bedframe 12 may be a bedframe of any conventional size, ranging between a twin size bedframe to a king size bedframe.

A plurality of collars 24 is each coupled to and extends laterally away from the outwardly facing edge 20 of a respective one of the plurality of intersecting members 14 such that each of the plurality of collars 24 lies on a horizontal plane. Each of the plurality of collars 24 has a hole 26 extending through a top surface 28 and a bottom surface 30 of a respective collar 24. The hole 26 in each of the plurality of collars 24 is displaced from the upper panel 18 of the respective intersecting member 14 and each of the plurality of collars 24 is aligned with a respective one of four corners 32 of the bedframe 12.

A lifting unit 34 is movably attached to the bedframe 12 having the lifting unit 34 resting upon a support surface 36. The support surface 36 may be floor of a bedroom of other type of horizontal support surface. The lifting unit 34 urges the bedframe 12 downwardly toward the support surface 36 when the lifting unit 34 is actuated into a lowering condition. In this way the lifting unit 34 facilitates a user 38 who employs a wheelchair 40 to transfer from the wheelchair 40 to a mattress 42 that is positioned on the bedframe 12. The lifting unit 34 urges the bedframe 12 upwardly from the support surface 36 when the lifting unit 34 is actuated into a lifting condition. In this way the lifting unit 34 facilitates the user 38 to sleep at a preferred height on the mattress 42.

The lifting unit 34 comprises a pair of master gear boxes 44 and each of the pair of master gear boxes 44 has a drive input 46 and a drive output 48 and a lifting output 50. The drive input 46 of a respective master gear box 44 is in mechanical communication with the drive output 48 of the respective master gear box 44 and the lifting output 50 of the respective master gear box 44. In this way the drive input 46 of the respective master gear box 44 rotates each of the drive output 48 and the lifting output 50 of the respective master gear box 44 when the drive input 46 of the respective master gear box 44 is rotated. The drive input 46 of each of the pair of master gear boxes 44 is disposed on a back side 52 of a respective master gear box 44 and the drive output 48 of each of the pair of master gear boxes 44 is disposed on a front side 54 of a respective master gear box 44. Additionally, the lifting output 50 is disposed on a top side 56 of a respective master gear box 44 and each of the pair of master gear boxes 44 is positioned beneath a respective one of the plurality of collars 24.

The lifting unit 34 includes a pair of slave gear boxes 58 and each of the pair of slave gear boxes 58 has a drive input 60 and a lifting output 62. The drive input 60 of a respective slave gear box 58 is in mechanical communication with the lifting output 62 of the respective slave gear box 58. In this way the drive input 60 on the respective slave gear box 58 rotates the lifting output 62 on the respective slave gear box 58 when the drive input 60 on the respective slave gear box 58 is rotated. The drive input 60 on each of the pair of slave gear boxes 58 is positioned on a back side 64 of the respective slave gear box 58 and the lifting output 62 on each of the pair of slave gear boxes 58 is positioned on a top side 66 of the respective slave gear box 58. Additionally, each of the slave gear boxes 58 is positioned beneath a respective one of the plurality of collars 24.

The lifting unit 34 includes a pair of motors 68 and each of the pair of motors 68 is coupled to the back side 52 of a respective one of the pair of master gear boxes 44. Additionally, each of the pair of motors 68 is in mechanical communication with the drive input 46 of the respective master gear box 44. Each of the pair of motors 68 rotates the drive input 46 of the respective master gear box 44 in a first direction when the motors 68 are actuated to rotate in a first direction. Conversely, each of the pair of motors 68 rotates the drive input 46 of the respective master gear box 44 in a second direction when the motors 68 are actuated to rotate in a second direction. Each of the pair of motors 68 may comprise a two direction electric motor or other type of motor that can produce rotational torque in two directions. Furthermore, the pair of motors 12 may produce sufficient rotational torque to facilitate the lifting unit 34 to lift a weight ranging between approximately 135.0 kg to 225.0 kg The lifting unit 34 includes a pair of drive shafts 70 and each of the pair of drive shafts 70 is mechanically coupled between the drive output 48 of a respective one of the pair of master gear boxes 44 and the drive input 60 of a respective one of the pair of slave gear boxes 58. In this way the drive output 48 of the respective master gear box 44 rotates the drive input 60 of the respective slave gear box 58. The lifting unit 34 includes a pair of master worm gears 72 and each of the pair of master worm gears 72 is mechanically coupled to and extends upwardly from the lifting output 50 of a respective one of the pair of master gear boxes 44. Each of the master worm gears 72 extends through the hole 26 in a respective one of the plurality of collars 24 on the bedframe 12 such that each of the pair of master worm gears 72 engages the respective collar 24. Each of respective collars 24 which engages the master worm gears 72 is urged upwardly along the master worm gears 72 when the pair of motors 68 is actuated to rotate in the first direction. Conversely, each of the respective collars 24 which engages the master worm gears 72 is urged downwardly along the master worm gears 72 when the pair of motors 68 is actuated to rotate in the second direction.

The lifting unit 34 includes a pair of slave worm gears 74 and each of the pair of slave worm gears 74 is mechanically coupled to and extends upwardly from the lifting output 62 of a respective one of the pair of slave gear boxes 58. Each of the slave worm gears 74 extends through the hole 26 in a respective one of the plurality of collars 24 on the bedframe 12 such that each of the pair of slave worm gears 74 engages the respective collar 24. Furthermore, each of respective collars 24 which engages the slave worm gears 74 is urged upwardly along the slave worm gears 74 when the pair of motors 68 is actuated to rotate in the first direction. Conversely, each of the respective collars 24 which engages the slave worm gears 74 is urged downwardly along the slave worm gears 74 when the pair of motors 68 is actuated to rotate in the second direction. A plurality of stops 76 is provided and each of the plurality of stops 76 is attached to a top end 78 of a respective one the slave worm gears 74 and a respective one of the master worm gears 72. In this way the plurality of stops 76 inhibits the respective slave worm gear 74 and the respective master worm gear 72 from fully travelling downwardly through the respective collar 24 and subsequently becoming uncoupled from the respective collar 24.

A communication unit 80 is provided and the communication unit 80 is integrated into the lifting unit 34. The communication unit 80 is in remote communication with a remote control 82 thereby facilitating the remote control 82 to remotely control the lifting unit 34. In this way the remote control 82 can enable the user 38 to remotely lift or lower the bedframe 12. The remote control 82 may comprise a personal electronic device 84, such as a smart phone for example, or other type of device that has wireless communication capabilities. Additionally, the personal electronic device 84 may store a control program, such as a smart phone application, to facilitate the lifting unit 34 to be remotely controlled.

The communication unit 80 comprises a control processor 86 which is in electrical communication with each of the pair of motors 68 and the control processor 86 receives a lift input and a lower input. Each of the pair of motors 68 is actuated to rotate in the first direction when the control processor 86 receives the lift input and each of the pair of motors 68 is actuated to rotate in the second direction when the control processor 86 receives the lower input. Furthermore, the control processor 86 is electrically coupled to a power source 88 which may comprise a power cord 90 that has a male plug 92 which can be plugged into a female electrical outlet 94.

The communication unit 80 includes a transceiver 96 which is electrically coupled to the control processor 86 and the transceiver 96 is in wireless communication with the remote control 82. The control processor 86 receives the lift input when the transceiver 96 receives a lift command from the remote control 82. Furthermore, the control processor 86 receives the lower input when the transceiver 96 receives a lower command from the remote control 82. The transceiver 96 may comprise a radio frequency transceiver or the like and the transceiver 96 may employ Bluetooth communication protocols. In this way the transceiver 96 can be synchronized with the personal electronic device 84 in the convention of Bluetooth communication protocols. The communication unit 80 may include a microphone 98 that can detect verbal commands from the user 38 and an electronic memory 100 which stores a voice recognition program 102. Furthermore, the voice recognition program 102 may recognize several voice commands, including but not being limited to "lift the bed" and "lower the bed" and "stop" to facilitate the lifting unit 34 to be voice controlled.

In use, the remote control 82 is manipulated by the user 38 to actuate the lifting unit 34 into the lowering condition thereby facilitating the bedframe 12 to be lowered to a desired height from the support surface 36. In this way the user 38 can easily transfer from their wheelchair 40 into the mattress 42 that is positioned on the bedframe 12. The user 38 can subsequently manipulate the remote control 82 to actuate the lifting unit 34 into the lifting condition to lift the bedframe 12 to a desired height. In this way the user 38 can subsequently sleep on the mattress 42 at a desired height. Furthermore, the user 38 could also speak the verbal commands to facilitate the microphone 98 and the voice recognition program 102 to control the lifting unit 34.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bedframe lifting device for lifting or lowering a bedframe to facilitate a physically disabled person to transfer from a wheelchair into a mattress positioned on the bedframe, said device comprising:

a bedframe having a plurality of intersecting members being perpendicularly oriented with each other such that said bedframe has a rectangular shape;

a lifting unit being movably attached to said bedframe having said lifting unit resting upon a support surface, said lifting unit urging said bedframe downwardly toward said support surface when said lifting unit is actuated into a lowering condition where in said lifting unit is configured to facilitate a user who employs a wheelchair to transfer from the wheelchair to a mattress that is positioned on said bedframe, said lifting unit urging said bedframe upwardly from said support surface when said lifting unit is actuated into a lifting condition wherein said lifting unit is configured to facilitate the user to sleep at a preferred height on the mattress;

a communication unit being integrated into said lifting unit, said communication unit being in remote communication with a personal electronic device thereby facilitating said personal electronic device to remotely control said lifting unit wherein said personal electronic device is configured to facilitate the user to remotely lift or lower said bedframe;

wherein:

each of said plurality of intersecting members has a lower panel being perpendicular to an upper panel;

said lower panel of each of said plurality of intersecting members lies on a horizontal plane;

said upper panel of each of said plurality of intersecting members lies on a vertical plane;

said upper panel of each of said plurality of intersecting members is aligned with an outwardly facing edge of said lower panel of a respective intersecting member;

an inwardly facing edge of each of said plurality of intersecting members is directed toward an opposing one of said plurality of intersecting members;

said device includes a plurality of collars;

each of said plurality of collars is coupled to and extends laterally away from said outwardly facing edge of a respective one of said plurality of intersecting members such that each of said plurality of collars lies on a horizontal plane;

each of said plurality of collars has a hole extending through a top surface and a bottom surface of a respective collar;

said hole in each of said plurality of collars is displaced from said upper panel of said respective intersecting member;

each of said plurality of collars is aligned with a respective one of four corners of said bedframe; and wherein:

said lifting unit comprises a pair of master gear boxes;

each of said pair of master gear boxes has a drive input and a drive output and a lifting output;

said drive input of a respective master gear box is in mechanical communication with said drive output of said respective master gear box and said lifting output of said respective master gear box such that said drive input of said respective master gear box rotates each of said drive output and said lifting output of said respective master gear box when said drive input of said respective master gear box is rotated; said drive input of each of said pair of master gear boxes is disposed on a back side of a respective master gear box;

said drive output of each of said pair of master gear boxes is disposed on a front side of a respective master gear box;

said lifting output is disposed on a top side of a respective master gear box; and each of said pair of master gear boxes is positioned beneath a respective one of said plurality of collars.

2. The device according to claim 1, wherein:

said lifting unit includes a pair of slave gear boxes;

each of said pair of slave gear boxes has a drive input and a lifting output;

said drive input of a respective slave gear box is in mechanical communication with said lifting output of said respective slave gear box such that said drive input on said respective slave gear box rotates said lifting output on said respective slave gear box when said drive input on said respective slave gear box is rotated;

said drive input on each of said pair of slave gear boxes is positioned on a back side of said respective slave gear box;

said lifting output on each of said pair of slave gear boxes is positioned on a top side of said respective slave gear box; and each of said slave gear boxes is positioned beneath a respective one of said plurality of collars.

3. The device according to claim 1, wherein:

said lifting unit includes a pair of motors;

each of said pair of motors is coupled to said back side of a respective one of said pair of master gear boxes;

each of said pair of motors is in mechanical communication with said drive input of said respective master gear box;

each of said pair of motors rotates said drive input of said respective master gear box in a first direction when said motors are actuated to rotate in a first direction; and each of said pair of motors rotates said drive input of said respective master gear box in a second direction when said motors are actuated to rotate in a second direction.

4. The device according to claim 3, wherein:

said lifting unit includes a pair of master worm gears;

each of said pair of master worm gears is mechanically coupled to and extends upwardly from said lifting output of a respective one of said pair of master gear boxes;

each of said master worm gears extends through said hole in a respective one of said plurality of collars on said bedframe such that each of said pair of master worm gears engages said respective collar;

each of respective collars which engages said master worm gears is urged upwardly along said master worm gears when said pair of motors is actuated to rotate in said first direction; and each of said respective collars which engages said master worm gears is urged downwardly along said master worm gears when said pair of motors is actuated to rotate in said second direction.

5. The device according to claim 1, wherein:

said lifting unit includes a pair of slave worm gears;

each of said pair of slave worm gears is mechanically coupled to and extends upwardly from said lifting output of a respective one of said pair of slave gear boxes;

each of said slave worm gears extends through said hole in a respective one of said plurality of collars on said bedframe such that each of said pair of slave worm gears engages said respective collar;

each of respective collars which engages said slave worm gears is urged upwardly along said slave worm gears when said pair of motors is actuated to rotate in said first direction; and each of said respective collars which engages said slave worm gears is urged downwardly along said slave worm gears when said pair of motors is actuated to rotate in said second direction.

6. The device according to claim 3, wherein:

said communication unit comprises a control processor being in electrical communication with each of said pair of motors;

said control processor receives a lift input and a lower input;

each of said pair of motors is actuated to rotate in said first direction when said control processor receives said lift input;

each of said pair of motors is actuated to rotate in said second direction when said control processor receives said lower input;

said control processor is electrically coupled to a power source;

said communication unit comprises a transceiver being electrically coupled to said control processor;

said transceiver is in wireless communication with said remote control;

said control processor receives said lift input when said transceiver receives a lift command from said remote control; and said control processor receives said lower input when said transceiver receives a lower command from said remote control.

7. The device according to claim 1, wherein:

said lifting unit includes a pair of drive shafts and a pair of slave gear boxes;

each of said pair of slave gear boxes has a drive input; and each of said pair of drive shafts is mechanically coupled between said drive output of a respective one of said pair of master gear boxes and said drive input of a respective one of said pair of slave gear boxes such that said drive output of said respective master gear box rotates said drive input of said respective slave gear box.

8. A bedframe lifting device for lifting or lowering a bedframe to facilitate a physically disabled person to transfer from a wheelchair into a mattress positioned on the bedframe, said device comprising:

a bedframe having a plurality of intersecting members being perpendicularly oriented with each other such that said bedframe has a rectangular shape, each of said plurality of intersecting members having a lower panel being perpendicular to an upper panel, said lower panel of each of said plurality of intersecting members lying on a horizontal plane, said upper panel of each of said plurality of intersecting members lying on a vertical plane, said upper panel of each of said plurality of intersecting members being aligned with an outwardly facing edge of said lower panel of a respective intersecting member, an inwardly facing edge of each of said plurality of intersecting members being directed toward an opposing one of said plurality of intersecting members;

a plurality of collars, each of said plurality of collars being coupled to and extending laterally away from said outwardly facing edge of a respective one of said plurality of intersecting members such that each of said plurality of collars lies on a horizontal plane, each of said plurality of collars having a hole extending through a top surface and a bottom surface of a respective collar, said hole in each of said plurality of collars being displaced from said upper panel of said respective intersecting member, each of said plurality of collars being aligned with a respective one of four corners of said bedframe;

a lifting unit being movably attached to said bedframe having said lifting unit resting upon a support surface, said lifting unit urging said bedframe downwardly toward said support surface when said lifting unit is actuated into a lowering condition wherein said lifting unit is configured to facilitate a user who employs a wheelchair to transfer from the wheelchair to a mattress that is positioned on said bedframe, said lifting unit urging said bedframe upwardly from said support surface when said lifting unit is actuated into a lifting condition wherein said lifting unit is configured to facilitate the user to sleep at a preferred height on the mattress, said lifting unit comprising:

a pair of master gear boxes, each of said pair of master gear boxes having a drive input and a drive output and a lifting output, said drive input of a respective master gear box being in mechanical communication with said drive output of said respective master gear box and said lifting output of said respective master gear box such that said drive input of said respective master gear box rotates each of said drive output and said lifting output of said respective master gear box when said drive input of said respective master gear box is rotated, said drive input of each of said pair of master gear boxes being disposed on a back side of a respective master gear box, said drive output of each of said pair of master gear boxes being disposed on a front side of a respective master gear box, said lifting output being disposed on a top side of a respective master gear box, each of said pair of master gear boxes being positioned beneath a respective one of said plurality of collars;

a pair of slave gear boxes, each of said pair of slave gear boxes having a drive input and a lifting output, said drive input of a respective slave gear box being in mechanical communication with said lifting output of said respective slave gear box such that said drive input on said respective slave gear box rotates said lifting output on said respective slave gear box when said drive input on said respective slave gear box is rotated, said drive input on each of said pair of slave gear boxes being positioned on a back side of said respective slave gear box, said lifting output on each of said pair of slave gear boxes being positioned on a top side of said respective slave gear box, each of said slave gear boxes being positioned beneath a respective one of said plurality of collars;

a pair of motors, each of said pair of motors being coupled to said back side of a respective one of said pair of master gear boxes, each of said pair of motors being in mechanical communication with said drive input of said respective master gear box, each of said pair of motors rotating said drive input of said respective master gear box in a first direction when said motors are actuated to rotate in a first direction, each of said pair of motors rotating said drive input of said respective master gear box in a second direction when said motors are actuated to rotate in a second direction;

a pair of drive shafts, each of said pair of drive shafts being mechanically coupled between said drive output of a respective one of said pair of master gear boxes and said drive input of a respective one of said pair of slave gear boxes such that said drive output of said respective master gear box rotates said drive input of said respective slave gear box;

a pair of master worm gears, each of said pair of master worm gears being mechanically coupled to and extending upwardly from said lifting output of a respective one of said pair of master gear boxes, each of said master worm gears extending through said hole in a respective one of said plurality of collars on said bedframe such that each of said pair of master worm gears engages said respective collar, each of respective collars which engages said master worm gears being urged upwardly along said master worm gears when said pair of motors is actuated to rotate in said first direction, each of said respective collars which engages said master worm gears being urged downwardly along said master worm gears when said pair of motors is actuated to rotate in said second direction;

a pair of slave worm gears, each of said pair of slave worm gears being mechanically coupled to and extending upwardly from said lifting output of a respective one of said pair of slave gear boxes, each of said slave worm gears extending through said hole in a respective one of said plurality of collars on said bedframe such that each of said pair of slave worm gears engages said respective collar, each of respective collars which engages said slave worm gears being urged upwardly along said slave worm gears when said pair of motors is actuated to rotate in said first direction, each of said respective collars which engages said slave worm gears being urged downwardly along said slave worm gears when said pair of motors is actuated to rotate in said second direction; and a communication unit being integrated into said lifting unit, said communication unit being in remote communication with a remote control thereby facilitating said remote control to remotely control said lifting unit wherein said remote control is configured to facilitate the user to remotely lift or lower said bedframe, said communication unit comprising:

a control processor being in electrical communication with each of said pair of motors, said control processor receiving a lift input and a lower input, each of said pair of motors being actuated to rotate in said first direction when said control processor receives said lift input, each of said pair of motors being actuated to rotate in said second direction when said control processor receives said lower input, said control processor being electrically coupled to a power source; and a transceiver being electrically coupled to said control processor, said transceiver being in wireless communication with said remote control, said control processor receiving said lift input when said transceiver receives a lift command from said remote control, said control processor receiving said lower input when said transceiver receives a lower command from said remote control.

* * * * *